(12) United States Patent
Kido et al.

(10) Patent No.: US 11,896,020 B2
(45) Date of Patent: Feb. 13, 2024

(54) SLIT FORMING DEVICE

(71) Applicant: MAYEKAWA MFG. CO., LTD., Tokyo (JP)

(72) Inventors: Koji Kido, Tokyo (JP); Keigo Shibama, Tokyo (JP); Hiroyuki Sakurayama, Tokyo (JP); Akira Koizumi, Tokyo (JP); Hajime Akabane, Tokyo (JP); Masaomi Watanabe, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 266 days.

(21) Appl. No.: 17/608,852

(22) PCT Filed: Apr. 27, 2021

(86) PCT No.: PCT/JP2021/016784
§ 371 (c)(1),
(2) Date: Nov. 4, 2021

(87) PCT Pub. No.: WO2021/230071
PCT Pub. Date: Nov. 18, 2021

(65) Prior Publication Data
US 2022/0304317 A1    Sep. 29, 2022

(30) Foreign Application Priority Data

May 12, 2020  (JP) .................................. 2020-083682

(51) Int. Cl.
A22C 17/00    (2006.01)
(52) U.S. Cl.
CPC ...... *A22C 17/0006* (2013.01); *A22C 17/0093* (2013.01)

(58) Field of Classification Search
CPC ............ A22C 17/0006; A22C 17/0084; A22C 17/0069; A22C 17/004; A22B 5/035
(Continued)

(56) References Cited

U.S. PATENT DOCUMENTS 5,401,210 A * 3/1995 Manmoto .......... A22C 21/0076
452/136
6,059,648 A * 5/2000 Kodama .............. A22C 21/003
452/157
(Continued)

FOREIGN PATENT DOCUMENTS

EP    2724618 A1    4/2014
EP    2912947 A1    9/2015
(Continued)

OTHER PUBLICATIONS

Extended European search report issued in European Appln. No. 21803640.8 dated Jun. 28, 2022.
(Continued)

*Primary Examiner* — Richard T Price, Jr.
(74) *Attorney, Agent, or Firm* — ROSSI, KIMMS & McDOWELL LLP (57) ABSTRACT

A slit forming device according to an aspect includes a damper configured to pass through a plurality of stations arranged on a circumference, a slit forming blade disposed on an outer circumference side or an inner circumference side of a slit forming station among the plurality of stations, and a damper rotating part capable of rotating the damper about a vertical line such that a slit forming surface of a work faces the slit forming blade in the slit forming station.

9 Claims, 6 Drawing Sheets

(58) Field of Classification Search
USPC .......................................................... 452/148
See application file for complete search history.

(56) References Cited

U.S. PATENT DOCUMENTS

| | | | | |
|---|---|---|---|---|
| 6,106,384 | A * | 8/2000 | Mutoh | A22C 17/004 |
| | | | | 452/136 |
| 9,974,317 | B2 * | 5/2018 | Stooker | A22C 21/0069 |
| 2012/0231715 | A1 | 9/2012 | Kodama | |
| 2015/0250193 | A1 * | 9/2015 | Kido | A22C 21/0053 |
| | | | | 452/135 |
| 2021/0084916 | A1 | 3/2021 | Kido | |

FOREIGN PATENT DOCUMENTS

| | | | |
|---|---|---|---|
| JP | 3483710 | B2 | 1/2004 |
| JP | 2010193719 | A | 9/2010 |
| JP | 2013507101 | A | 3/2013 |
| JP | 2015039310 | A | 3/2015 |
| KR | 1020170139312 | A | 12/2017 |
| KR | 1020180038297 | A | 4/2018 |
| WO | 2019131357 | A1 | 7/2019 |
| WO | 2019131362 | A1 | 7/2019 |
| WO | 2019131363 | A1 | 7/2019 |

OTHER PUBLICATIONS

English translation of Written Opinion issued in Intl. Appln. No. PCT/JP2021/016784 dated Jul. 6, 2021, previously cited in IDS filed Nov. 4, 2021.
Office Action issued in Taiwanese Appln. No. 110116002 dated Feb. 17, 2022.
International Search Report issued in Intl. Appln. No. PCT/JP2021/016784 dated Jul. 6, 2021.
Written Opinion issued in Intl. Appln. No. PCT/JP2021/016784 dated Jul. 6, 2021.

* cited by examiner

VIEW A-A

B-B CROSS-SECTION

SLIT FORMING DEVICE

TECHNICAL FIELD

The present disclosure relates to a slit forming device.

BACKGROUND

De-boning work of a livestock carcass for meat is hard labor and is also inefficient if done manually, and thus has been automated. The present applicant has developed an automation technology in this field for a long time. Patent Document 1 proposes an automatic de-boning technique for bone-in meat, and Patent Document 2 proposes an automatic measurement technique of measuring the entire length of bone-in meat during conveyance. Further, Patent Document 3 proposes an automatic slit forming technique of forming a slit in bone-in meat during conveyance, and Patent Document 4 proposes an automatic de-boning technique increased in processing efficiency

CITATION LIST

Patent Literature

Patent Document 1: JP3483710B
Patent Document 2: WO2019/131357A
Patent Document 3: WO2019/131362A
Patent Document 4: WO2019/131363A

SUMMARY

Technical Problem

As importance of meat increases, an automatic de-boning technique for meat is required of, for example, improvement in processing efficiency (such as an increase in number of processes per unit time), a downsized automation device, versatility, and further improvement in yield of meat portions.

The present disclosure was made in view of the above, and an object of the present disclosure is to downsize a device for automating slit formation and to increase efficiency.

Solution to Problem

In order to achieve the above object, a slit forming device according to the present disclosure includes a damper configured to pass through a plurality of stations arranged on a circumference, a slit forming blade disposed on an outer circumference side or an inner circumference side of a slit forming station among the plurality of stations, and a clamper rotating part capable of rotating the clamper about a vertical line such that a slit forming surface of a work faces the slit forming blade in the slit forming station.

In the present specification, "work" refers to bone-in meat obtained by processing a livestock carcass for meat or bone-in meat (for example, bone-in limb meat such as arm meat or thigh meat) in the middle of processing.

In the present specification, "work" refers to bone-in meat obtained by slaughtering a livestock carcass for meat or bone-in meat (for example, bone-in limb meat such as arm meat or thigh meat) in the middle of slaughtering.

Advantageous Effects

According to a slit forming device according to the present disclosure, it is possible to downsize a device for automating a slit forming step and to improve processing efficiency.

DETAILED DESCRIPTION

Some embodiments of the present invention will be described below with reference to the accompanying drawings. It is intended, however, that unless particularly specified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, an expressions such as "comprising", "including", "having", "containing", and "constituting" one constitutional element are not intended to be exclusive of other constitutional elements.

Figure 1:
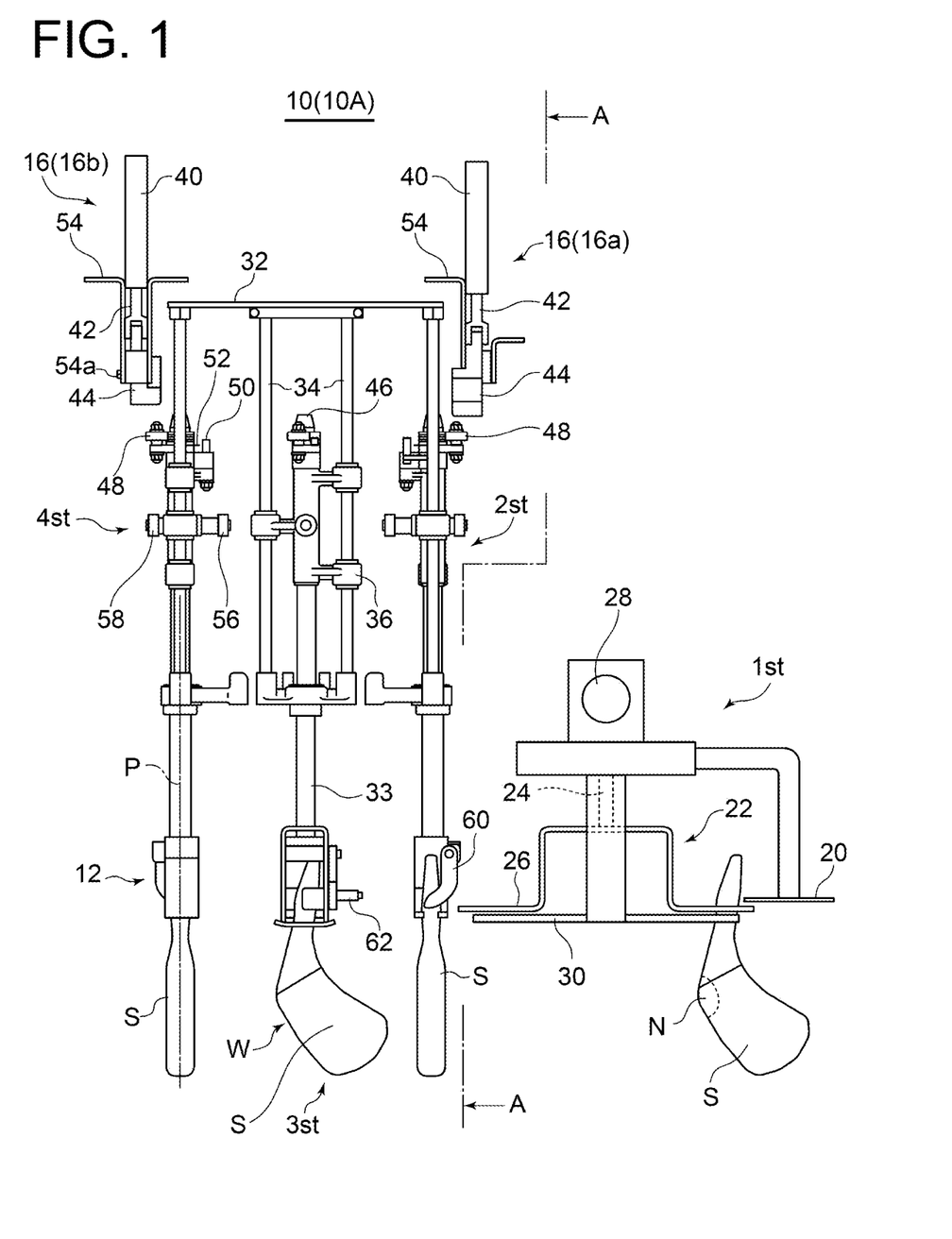
FIG. 1 is a side view of a slit forming device according to an embodiment.
Figure 2:
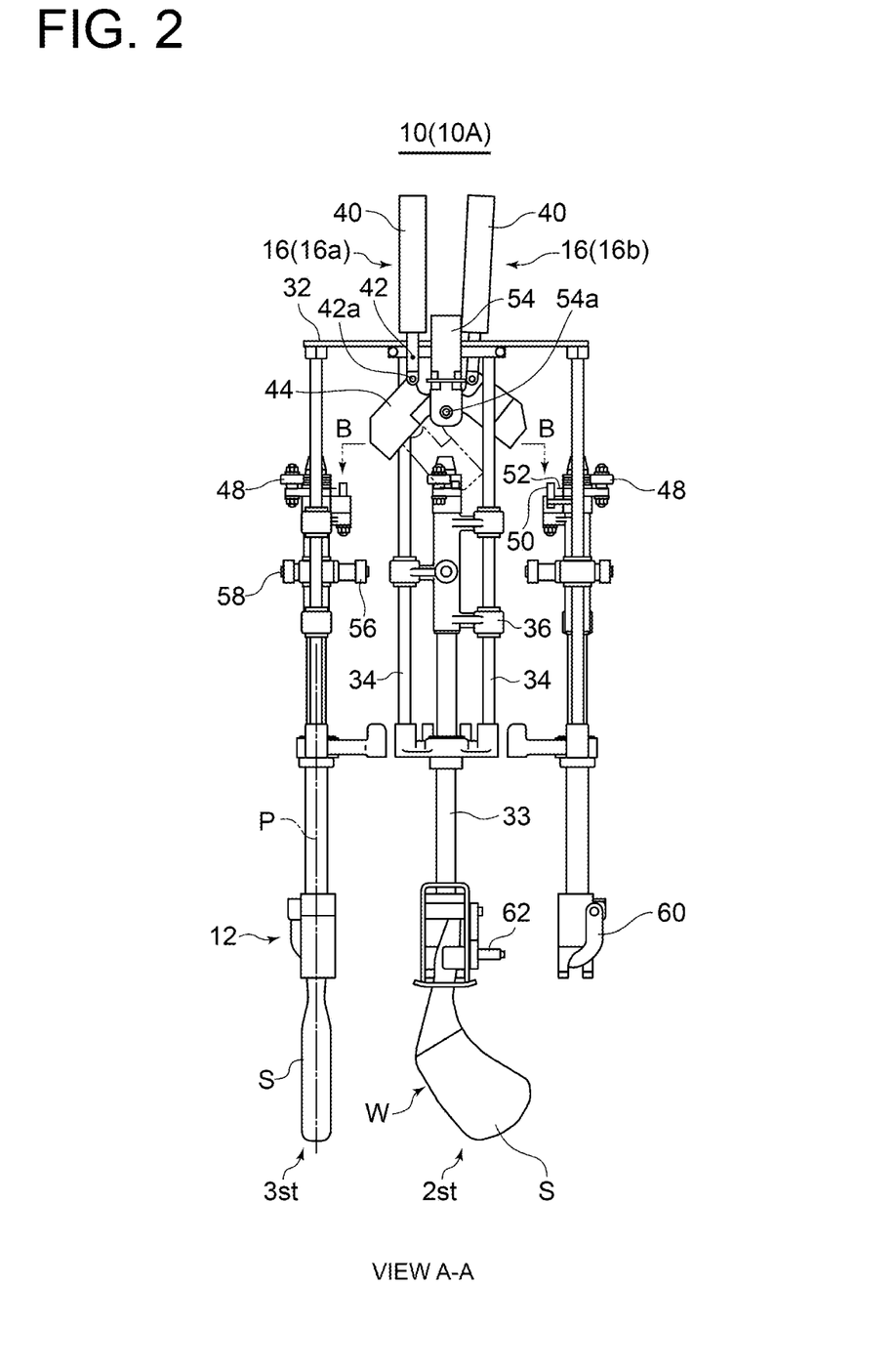
FIG. 2 is a front view where a part of the slit forming device is omitted according to an embodiment (taken along line A-A in FIG. 1).
Figure 3:
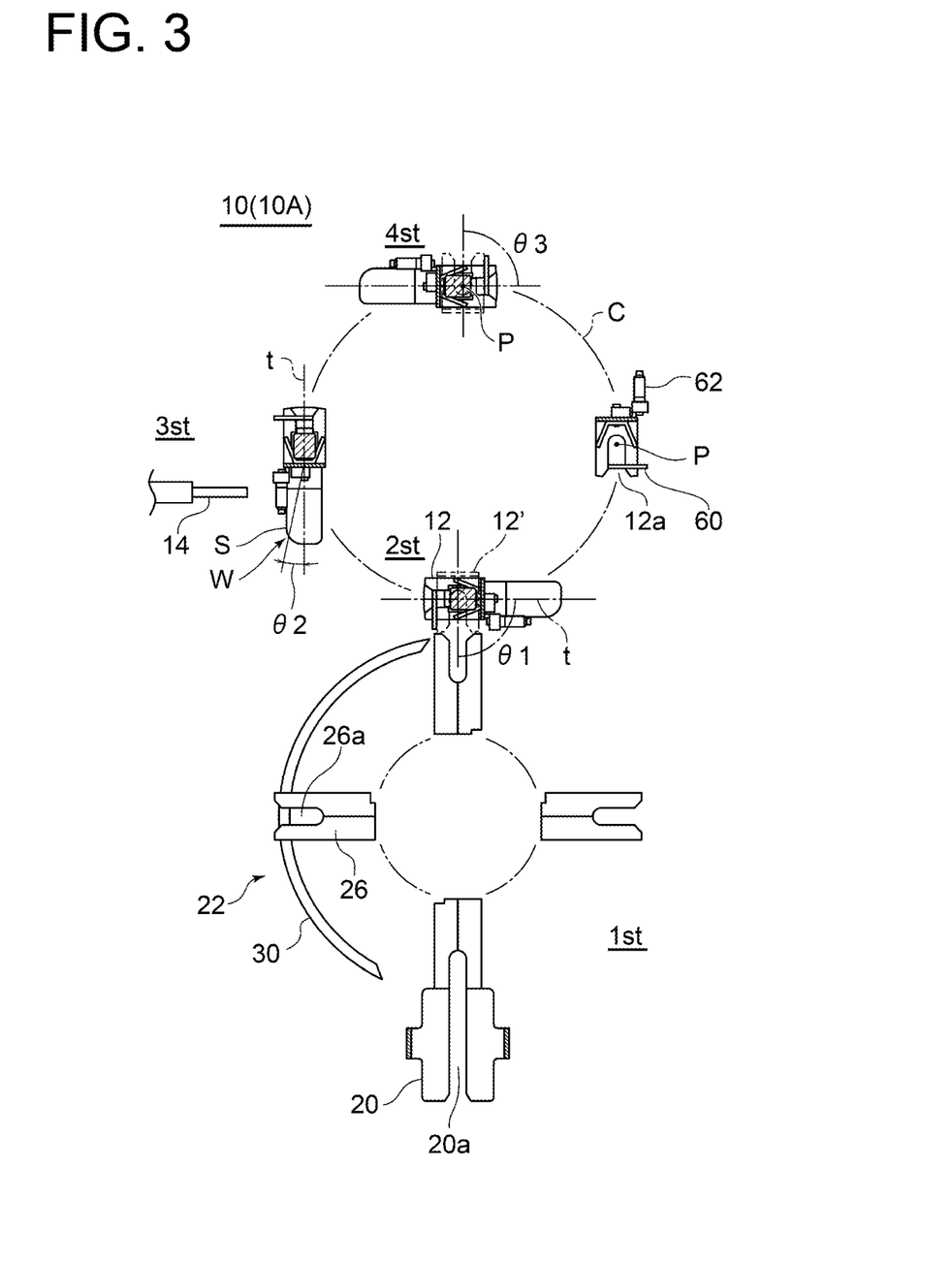
FIG. 3 is a schematic plan view of the slit forming device according to an embodiment.

FIGS. 1 to 3 each show a slit forming device 10 (10A) according to an embodiment. FIG. 1 is a side view of the slit forming device 10 (10A), FIG. 2 is a front view taken along line A-A in FIG. 1, and FIG. 3 is a schematic plan view of the slit forming device 10 (10A).

As shown in FIG. 3, the slit forming device 10 (10A) includes a plurality of processing stations 1st to 4st arranged on a circumference C. A damper 12 has a movement trajectory moving on the circumference C, and can pass through the plurality of stations while suspending a work W. Among the plurality of stations, the slit forming station 3st includes a slit forming blade 14 disposed on the outer side or inner side of the circumference C, and a damper rotating part 16 (16a, 16b) capable of rotating the damper 12 about a vertical line P. The damper rotating part 16 is configured to be able to rotate the damper 12 about the vertical line such that a slit forming surface S of the work W faces the slit forming blade 14 in the slit forming station 3st.

In an embodiment, the slit forming device 10 (10A) includes the loading station 2st upstream of the slit forming station 3st, and includes the discharge station 4st downstream of the slit forming station 3st. The damper rotating part 16 includes the damper rotating part 16 (16a) disposed in the loading station 2st, and the damper rotating part 16 (16b) disposed in the discharge station 4st. As shown in FIG. 3, the damper 12 has an opening 12a where the work W is to be loaded, and the orientation of the opening 12a is set such that the slit forming surface S faces the slit forming blade 14 in the slit forming station 3st, by rotating the damper 12 about the vertical line P with the damper rotating part 16 (16a).

The orientation of the slit forming surface S of the work W suspended by the damper 12 and the orientation of the opening 12a of the damper 12 are uniquely associated with each other, and once the angle of the opening 12a with respect to a tangent t to the circumference C is decided, the angle of the slit forming surface S with respect to the tangent t is uniquely decided.

Thus, since the plurality of stations 1st to 4st are arranged along the circumference C, it is possible to achieve downsized layout of the slit forming device 10 (10A). Further, with the damper rotating part 16, with respect to the slit forming blade 14 placed in a position radially deviated from the circumferential movement trajectory of the damper 12, it is possible to rotate the damper 12 such that the slit forming surface S of the work W faces the slit forming blade 14. Thus, it is possible to reliably perform slit formation on the slit forming surface S, making it possible to improve processing efficiency (such as an increase in processing numbers per unit time).

In an embodiment, as shown in FIGS. 1 and 3, the slit forming device 10 (10A) includes the transfer station 1st for loading the work W to the loading station 2st. The transfer station 1st loads the work W transferred by a work conveyance device (not shown) to the stopped damper 12 in the loading station 2st. The transfer station 1st includes a reception part 20 for receiving the work W from the above-described work conveyance device, and a transfer part 22 for loading the work W received by the reception part 20 to the stopped damper 12 in the loading station 2st. The reception part 20 has a slot 20a formed in the axial direction and pushes out, by a pusher (not shown) or the like, the work W suspended in the slot 20a to the transfer part 22.

As shown in FIG. 1, the transfer part 22 includes a rotational shaft 24 disposed in the vertical direction, a plurality of hangers 26 disposed around the rotational shaft 24, and a motor 28 for rotating the rotational shaft 24. In each hanger 26, a recess 26a where the work W is to be inserted and suspended is formed in the axial direction. The hanger 26 having received the work W from the reception part 20 is reversed by 180° to face the damper 12 waiting in the loading station 2st, and transfers the work W to the damper 12. In order to prevent the work W from falling off the recess 26a during the rotation of the hanger 26, a semi-circular guard ring 30 is provided.

In the upper part of a body portion of the slit forming device 10 (10A), a circular feed ring 32 is disposed in the horizontal direction. The feed ring 32 is configured to be rotatable about a vertical center axis by a drive device (not shown). A plurality of support shafts 33 are vertically disposed in the circumferential direction of the feed ring 32. Each support shaft 33 is supported to be lifted/lowered via a bracket 36 with respect to a pair of guide bars 34 mounted on the feed ring 32. The damper 12 is disposed at a lower end of each support shaft 33, and is sent with tact feed so as to be paused in each station by the above-described drive device.

In the exemplary embodiments shown in FIGS. 1 to 3, the loading station 2st, the slit forming station 3st, and the discharge station 4st are disposed at intervals of 90°, and an interval between the discharge station 4st and the loading station 2st is at 180°. Then, the work W is loaded to the damper 12 in the loading station 2st, the slit forming step is performed in the slit forming station 3st, and the work W having undergone slit formation is discharged in the discharge station 4st.

As shown in FIG. 1, the damper rotating part 16 (16a, 16b) includes an air cylinder 40 mounted on a fixed support part (not shown), and a cam member 44 is mounted on a tip portion of a piston 42 of the air cylinder 40. On the other hand, the support shaft 33 has a double shaft structure inside of which a rotatable shaft 46 rotatable about the shaft is concentrically disposed, and the damper 12 is mounted at a lower end of the rotatable shaft 46 and is configured to be rotatable about the shaft together with the rotatable shaft 46.

Figure 4:
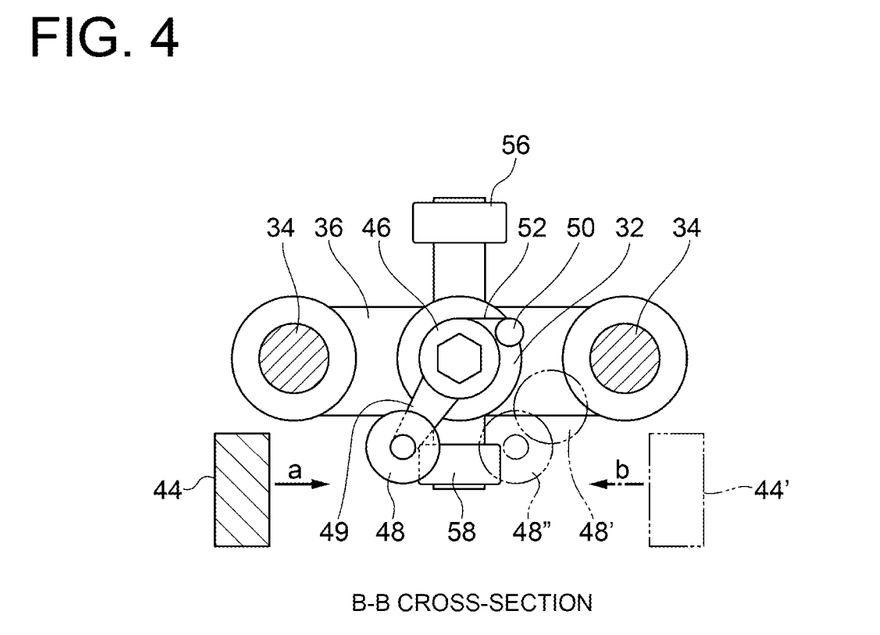
FIG. 4 is a cross-sectional view taken along line B-B in FIG. 2.

FIG. 4 is a cross-sectional view taken along line B-B in FIG. 2. Referring to FIG. 4, in an upper end portion of the rotatable shaft 46, a swing roller 48 is disposed integrally with the rotatable shaft 46 via an arm 49, and the swing roller 48 is rotatable about the rotatable shaft 46. Further, in the upper end portion of the support shaft 33, a clasp 50 is disposed integrally with the support shaft 33, as well as a coil spring 52 is wound around the rotatable shaft 46, and one end of the coil spring 52 is connected to the clasp 50.

As shown in FIG. 2, the cam member 44 is mounted on the tip portion of the piston 42 to be rotatable about a shaft 42a, and is mounted to be rotatable about a shaft 54a which is disposed on a support plate 54 mounted on the fixed support part (not shown). Thus, if the piston 42 extends, the cam member 44 rotates about the shaft 54a, moves downward, and hits against the swing roller 48, causing the swing roller 48 to rotate about the rotatable shaft 46. Then, the rotatable shaft 46 rotates about the shaft together with the swing roller 48. Consequently, the damper 12 also rotates about the vertical line P together with the rotatable shaft 46. If the piston 42 retreats, and the cam member 44 retreats upward, the swing roller 48 returns to a position before rotation by a spring force of the coil spring 52.

In an embodiment, the slit forming device 10 includes a lifting/lowering means for lifting/lowering the damper 12 at a predetermined height at a predetermined position. For example, as the lifting/lowering means, the bracket 36 includes a lifting/lowering roller 56 or 58 protruding to a radially inner side or outer side of the circumference C. Further, in a body center of the slit forming device 10, equipment such as a drive device (not shown) for the feed ring 32 is disposed, and an outer plate (not shown) is provided to enclose the equipment. In the outer plate, a traveling path (not shown) for allowing the lifting/lowering roller 56 or 58 to travel is formed. The lifting/lowering roller 56 or 58 travels through the above-described traveling path, lifting/lowering the rotatable shaft 46 and the damper 12 (see Patent Document 1).

In an embodiment, as shown in FIG. 1, the slit forming device 10 includes a chuck 60 rotatably disposed on the damper 12, for opening/closing the opening 12a of the damper 12, and a bar 62 disposed integrally with the chuck 60. On the circumference C, a contact piece (not shown) contacting the bar 62 to rotate the chuck 60 is disposed. The contact piece contacts the bar 62 when the damper 12 moves on the circumference C, operating the chuck 60 to open/close the opening 12a. Thus, the opening 12a is opened in the loading station 2st and the discharge station 4st to allow for loading and discharge of the work W, and the opening 12a is closed in the slit forming station 3st to prevent the work W from falling off.

In another embodiment, a control device for controlling a drive device for the chuck 60 is provided, and the control device may control an opening/closing timing of the chuck 60.

In an embodiment, as shown in FIG. 3, in the loading station 2st, when the work W is loaded from the transfer station 1st to the damper 12, the damper 12 is rotated by the damper rotating part 16 (16a) in a direction of 12' indicated by a double-dotted chain line, and the opening 12a faces outward relative to the circumference C. The damper rotating part 16 controls a rotation angle of the damper 12 such that a difference between a first angle θ1, which is formed by the slit forming surface S with respect to the direction of the tangent t to the circumference C in the loading station 2st, and a second angle θ2, which is formed by the slit forming surface S with respect to the direction of the tangent t to the circumference C in the slit forming station 3st, falls within 80° to 100°.

In an embodiment, the first angle θ1 may change in accordance with the operation of the damper rotating part 16 in the loading station 2st. Likewise, the second angle θ2 may change in accordance with the operation of the damper rotating part 16 in the slit forming station 3st. In this case, it is only necessary that the difference between the first angle θ1 while the work W is loaded to the loading station 2st and the second angle θ2 while the slit forming surface S faces the slit forming blade 14 falls within 80° to 100°. For example, it is only necessary that a value obtained by subtracting the second angle θ2 from the first angle θ1 falls within 80° to 100°.

In the present specification, "upstream" or "downstream" means upstream of a moving direction of the damper 12 or downstream of the moving direction of the damper 12.

According to the present embodiment, in the loading station 2st and the slit forming station 3st, it is possible to orient the slit forming surface S of the work W at the angle suitable for the processing operation in each of these stations, making it possible to improve working efficiency.

In the loading station 2st, the slit forming device 10 (10A) operates the damper rotating part 16 (16a) to rotate the swing roller 48 by the cam member 44, thereby setting the slit forming surface S at the first angle θ1. In the slit forming station 3st, the slit forming device 10 (10A) sets the slit forming surface S at the second angle θ2 by an elastic force of the coil spring 52 applied to the swing roller 48, without operating the damper rotating part 16 (16a).

In an embodiment, the work W refers to bone-in meat (such as arm meat or thigh meat) obtained by processing or in the middle of processing a livestock carcass for meat. Then, an ankle portion is inserted into the slot 20a of the clamper 12 to be suspended. In the exemplary embodiments shown in FIGS. 1 and 3, the work W is chicken thigh. The bone-in limb meat has one surface which is a first surface (meat surface) where meat is exposed, and another surface which is a second surface (skin surface) covered with skin. If the skin on the skin surface is cut in the slit forming step, a commercial value of boneless meat is decreased. Thus, in the slit forming station 3st, it is necessary that the meat surface faces the slit forming blade 14 to be cut by the slit forming blade 14. According to the above embodiment, it is possible to cause the meat surface to face the slit forming blade 14 by the clamper rotating part 16 (16a). If the work W is the bone-in limb meat, the first surface and the second surface of the bone-in limb meat suspended by the clamper 12, and the opening 12a face the same direction.

In an embodiment, as shown in FIG. 3, the first angle θ1 of the slit forming surface S in the loading station 2st is in a 90° direction orthogonal to the direction of the tangent t to the circumference C, and the second angle θ2 of the slit forming surface S in the slit forming station 3st is in a direction along the direction of the tangent t to the circumference C, that is 0°. According to the present embodiment, since the first angle θ1 is 90° in the loading station 2st, the work W is easily loaded to the damper 12. Further, since the second angle θ2 is 0° in the slit forming station 3st, it is possible to arrange the work W such that the slit forming surface S of the work W faces the slit forming blade 14 placed in the position radially deviated from the circumferential trajectory of the damper 12. Accordingly, it is possible to perform slit formation accurately and efficiently.

In an embodiment, in the loading station 2st, the slit forming device 10 (10A) rotates the swing roller 48 by the cam member 44, thereby setting the first angle θ1 at 90°. Then, in the slit forming station 3st, the slit forming device 10 (10A) sets the second angle θ2 formed by the slit forming surface S always at 0° by keeping the rotatable shaft 46 applied with the elastic force of the coil spring 52, without rotating the swing roller 48 by the cam member 44.

In an embodiment, as shown in FIG. 3, the slit forming device 10 (10A) includes the discharge station 4st downstream of the slit forming station 3st and performs an operation of discharging the work W having undergone slit formation in the discharge station 4st. The damper rotating part 16 (16b) controls the slit forming surface S to have a third angle θ3 in the discharge station 4st, and rotates the damper 12 such that a difference between the second angle θ2 and the third angle θ3 formed by the slit forming surface S in the discharge station 4st falls within 80° to 100°. According to the present embodiment, in the discharge station 4st, it is possible to orient the work W at the angle suitable for the discharge operation, facilitating the discharge operation. Therefore, it is possible to improve processing efficiency of the slit forming device 10 (10A).

The third angle θ3 may change in accordance with the operation of the damper rotating part 16 in the discharge station 4st. In this case, it is only necessary that the difference between the second angle θ2 and the third angle θ3 while the work W is discharged in the discharge station 4st falls within 80° to 100°. For example, it is only necessary that a value obtained by subtracting the second angle θ2 from the third angle θ3 falls within 80° to 100°.

The third angle θ3 may be the same as the first angle θ1. Thus, the damper rotating part 16 can be operated easily.

In an embodiment, in the slit forming station 3st, the slit forming device 10 (10A) sets the slit forming surface S at the second angle θ2 by the elastic force of the coil spring 52 applied to the swing roller 48, without operating the damper rotating part 16 (16a). In the discharge station 4st, the slit forming device 10 (10A) operates the damper rotating part 16 (16a) to rotate the swing roller 48 by the cam member 44, thereby setting the slit forming surface S at the third angle θ3.

In an embodiment, the third angle θ3 is in a direction orthogonal to a tangent direction to the circumference C. Thus, the opening 12a of the damper 12 faces outward relative to the circumference C, facilitating discharge of the work W having undergone slit formation.

In an embodiment, in the discharge station 4st, the slit forming device 10 (10A) operates the damper rotating part 16 (16b), lowers the cam member 44, and rotates the swing roller 48, thereby setting the third angle θ3 at 90°.

In an embodiment, the damper rotating part 16 is configured to be able to switch a rotation direction of the damper 12. When the work W is bone-in limb meat including a right limb and a left limb, the presence of the meat surface and the skin surface is reversed with respect to a bone portion between the right limb and the left limb. According to the present embodiment, since the rotation direction of the damper 12 is switchable, it is possible to always arrange the meat surface, as the slit forming surface S, to face the slit forming blade 14 even if the work W suspended by the damper 12 includes the right limb and the left limb. Thus, it is possible to form slits in the right limb and the left limb, respectively.

In FIG. 4, for example, in the loading station 2st, if the damper 12 is rotated, the damper rotating part 16 (16a) is operated to move the cam member 44 in a direction of an arrow a. The cam member 44 rotates the swing roller 48 around the vertical axis of the rotatable shaft 46 (such as 90°), and rotates the swing roller 48 to a position of a swing roller 48'. If the damper 12 is rotated in a backward direction, the cam member 44 is relocated at a position of 44', as well as the swing roller 48 is relocated at a position of 48". Then, the damper rotating part 16 (16a) is operated to move the cam member 44' to a direction of an arrow b, and to move the swing roller 48" in an opposite direction to the swing roller 48.

Figure 5:
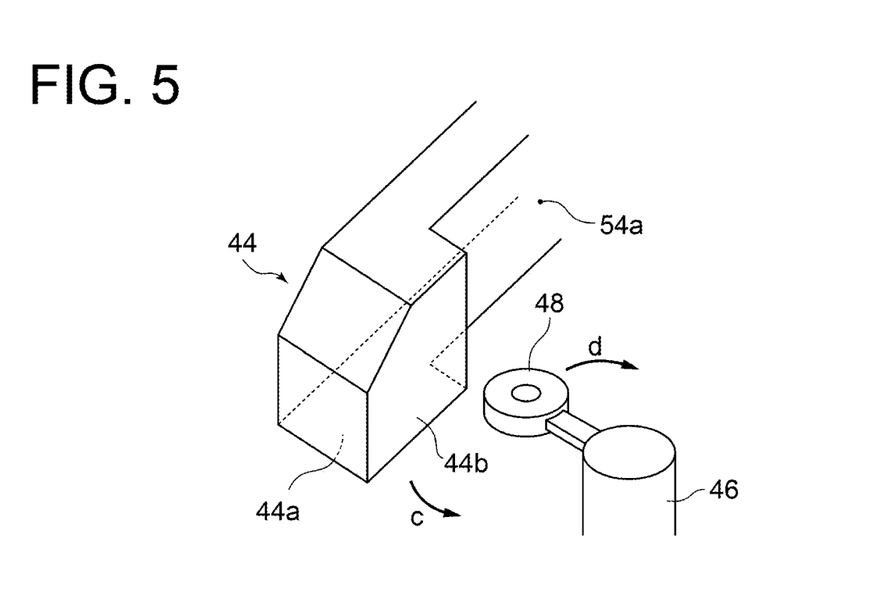
FIG. 5 is a schematic perspective view for describing an operation of a cam member according to an embodiment.
Figure 6:
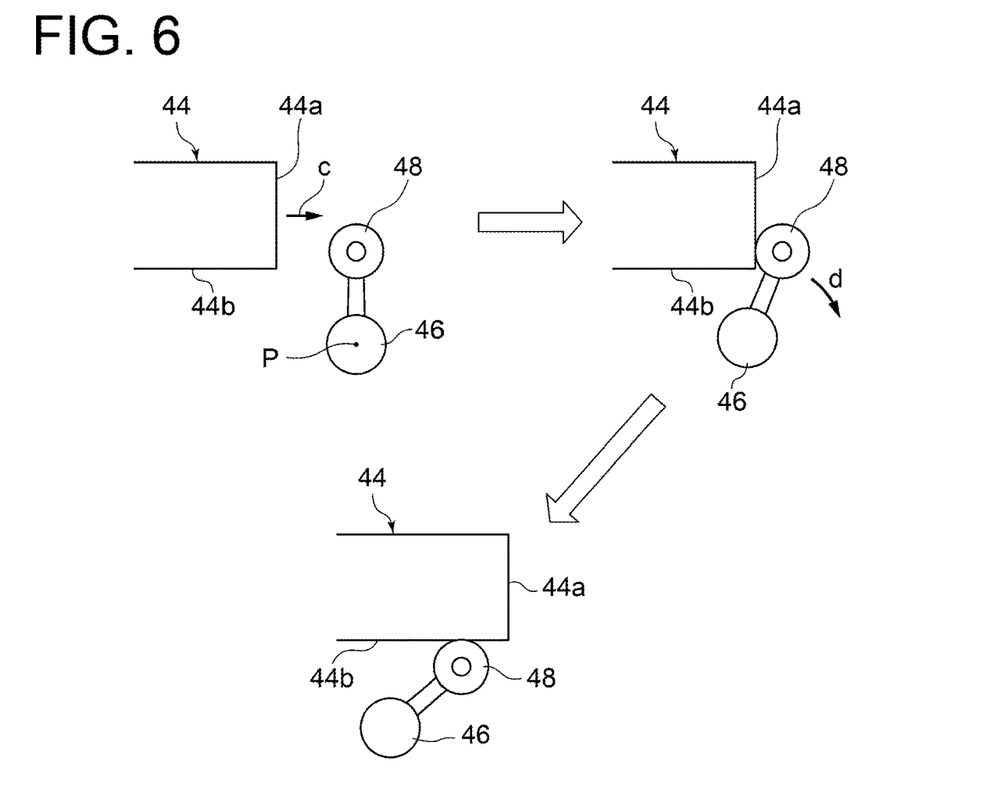
FIG. 6 is a schematic planar view for describing the operation of the cam member according to an embodiment.

FIGS. 5 and 6 each show an aspect in which the cam member 44 pushes the swing roller 48 to rotate about the rotatable shaft 46. FIG. 5 is a schematic perspective view, and FIG. 6 is a schematic planar view showing the operation of the cam member 44 in sequence.

As shown in FIGS. 5 and 6, operating the damper rotating part 16, the cam member 44 moves in a direction of an arrow c (downward in the drawing of FIG. 5) centering around the shaft 54a, and approaches the swing roller 48. Subsequently, first, a bottom surface 44a of the cam member 44 contacts the swing roller 48, and the swing roller 48 is rotated about the rotatable shaft 46 in a direction of an arrow d. Next, as the cam member 44 moves, a contact surface with the swing roller 48 is shifted from the bottom surface 44a to a side surface 44b. While the cam member 44 contacts the swing roller 48, the swing roller 48 is rotated about the vertical line P by a predetermined angle. If the piston 42 retreats, and the cam member 44 is lifted and separated from the swing roller 48, the swing roller 48 returns to the position before rotation relative to the rotatable shaft 46 by the elastic force of the coil spring 52.

Figure 7:
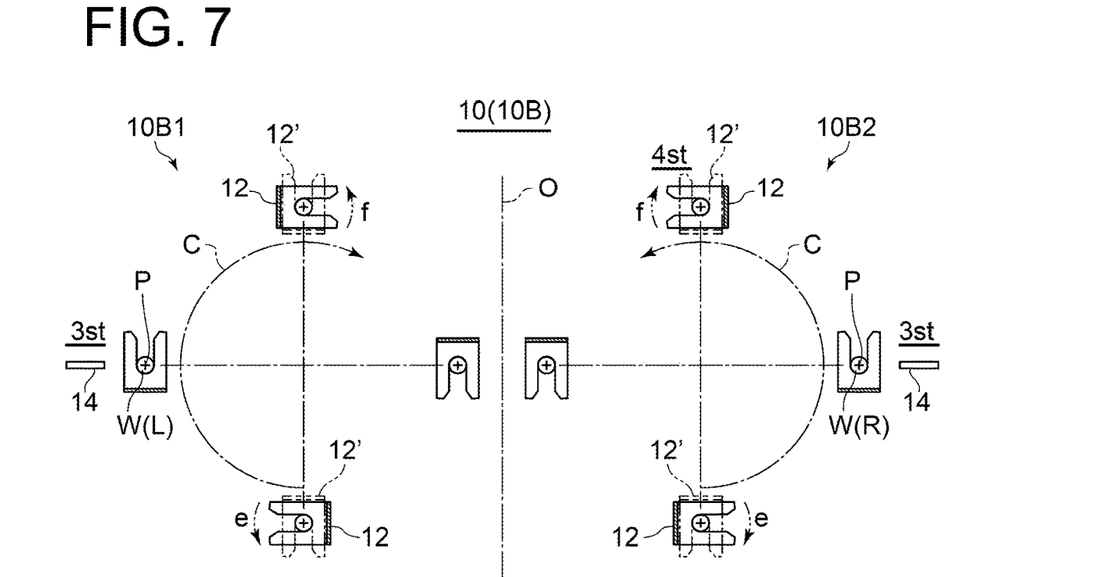
FIG. 7 is a schematic planar view of the slit forming device according to an embodiment.
Figure 8:
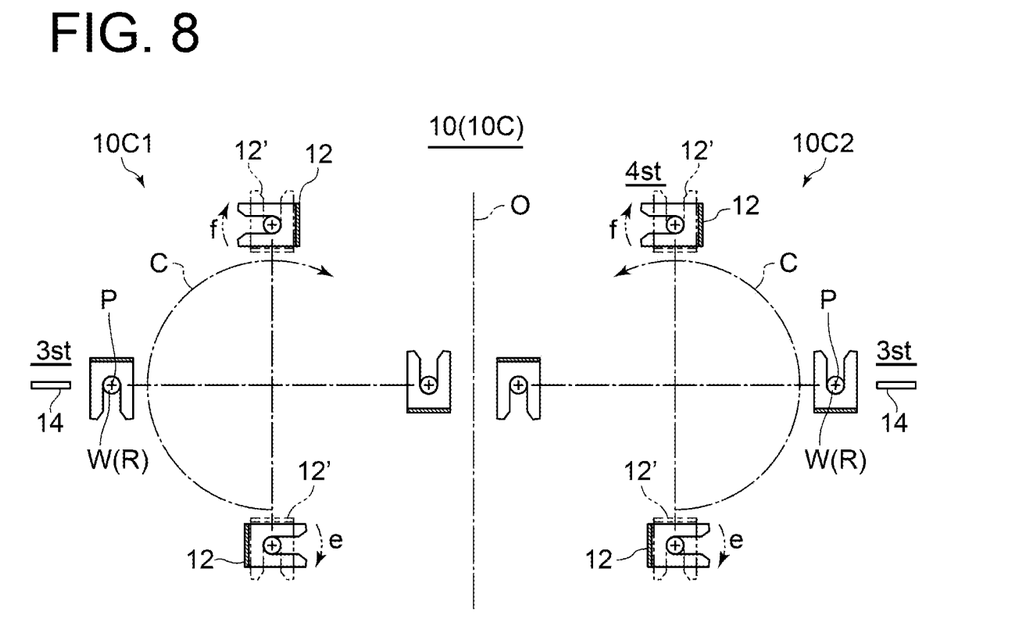
FIG. 8 is a schematic planar view of the slit forming device according to an embodiment.
Figure 9:
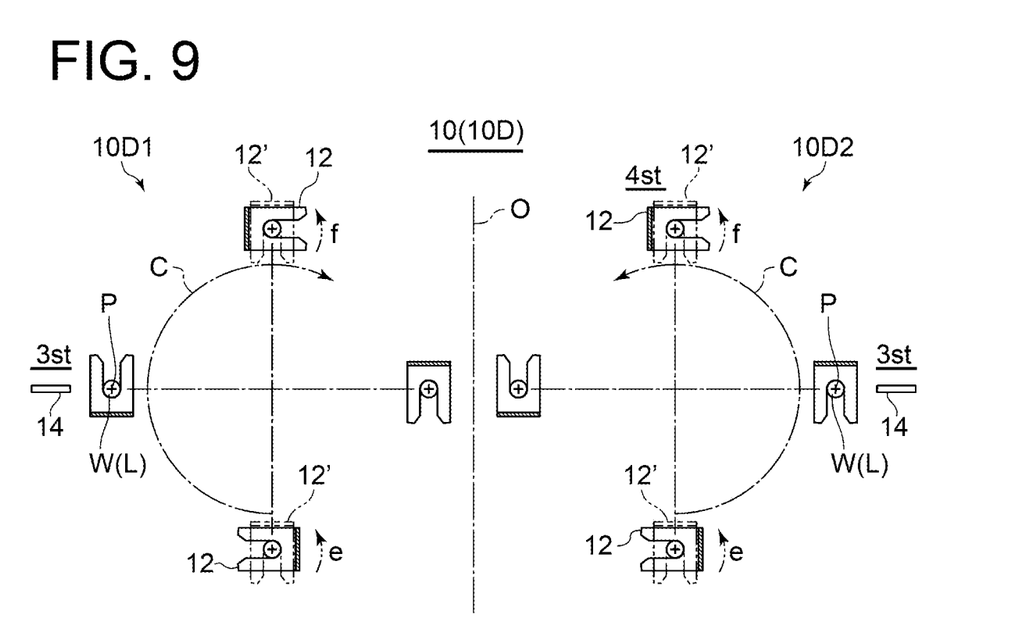
FIG. 9 is a schematic planar view of the slit forming device according to an embodiment.

FIGS. 7 to 9 are schematic planar views according to some embodiments. In FIGS. 7 to 9, the slit forming device 10 (10B, 10C, 10D) is constituted by two slit forming devices. The slit forming device 10 (10B to 10D) is configured such that the movement trajectories (circumferences C) of the dampers 12 of the two slit forming devices are mirror symmetrical. In FIGS. 7 to 9, arrows given to the movement trajectories C indicate the moving directions of the dampers 12, respectively. According to the present embodiments, since the two slit forming devices and the movement trajectories C of the dampers 12 are mirror symmetrical, downsized arrangement of the two slit forming devices is possible, and using the two slit forming devices, it is possible to increase processing efficiency of the works W.

In FIGS. 7 to 9, the two slit forming devices and the moving directions of the dampers 12 are mirror symmetrical. In another embodiment, the two slit forming devices and the moving directions of the dampers 12 may be the same.

In an embodiment, the slit forming device 10 (10B to 10D) sets a side without the processing stations being arranged as the inner side of the circumference C and places the processing stations 2st to 4st on the outer side of the circumference C, facilitating maintenance of the processing stations 2st to 4st.

The slit forming device 10 (10B) shown in FIG. 7 is configured such that, in the loading station 2st, the damper 12 indicated by a solid line is rotated by the damper rotating part 16 (16a) in a direction of an arrow e to be set in the orientation of a damper 12' indicated by a long dashed double-dotted line. That is, the rotation directions of the dampers 12 in the loading stations 2st between two slit forming devices 10B1 and 10B2 are mirror symmetrical as indicated by the arrows e. Further, in the discharge station 4st, the damper 12 indicated by the solid line is rotated by the damper rotating part 16 (16b) in a direction of an arrow f to be set in the orientation of the damper 12' indicated by the long dashed double-dotted line. That is, the rotation directions of the dampers 12 in the discharge stations 4st between the two slit forming devices 10B1 and 10B2 are mirror symmetrical as indicated by the arrows f. In the loading station 2st, after the damper 12' receives the work W, the damper 12' returns to the orientation of the damper 12, and the damper 12 moves toward the slit forming station 3st. In the discharge station 4st, after the damper 12' discharges the work W, the damper 12' returns to the orientation of the damper 12.

If the work W includes a right limb W(R) and a left limb W(L) of the bone-in limb meat, the left limb W(L) is loaded to the slit forming device 10B1, and the right limb W(R) is loaded to the slit forming device 10B2. When the works W are placed on the reception parts 20 of the transfer stations 1st in the same orientation (that is, when knee joint portions N are placed in the same direction) in the slit forming devices 10B1 and 10B2, the meat surfaces, which are the slit forming surfaces S, are reversed with respect to the bone portions between the right limb W(R) and the left limb W(L). As a side note, in the exemplary embodiments shown in FIGS. 1 and 2, as the work W, the left limb W(L) of the chicken thigh is to undergo slit formation. For example, as shown in FIG. 1, when the knee joint portions N of the right limb W(R) and the left limb W(L) are placed on the reception parts 20 to face forward, in the slit forming device 10 (10B), the slit forming surfaces S (meat surfaces) of both the right limb W(R) and the left limb W(L) face outward relative to a center line O (see FIG. 7).

Subsequently, the works W are loaded to the loading station 2st upon 180-degree reverse of the hangers 26, and thus in the works W suspended by the dampers 12 in the loading stations 2st, the slit forming surfaces S (meat surfaces) of both the right limb W(R) and the left limb W(L)

face the side of the center line O. At this time, in the loading station 2st for each of the slit forming devices 10B1 and 10B2, the damper 12 is rotated by the damper rotating part 16 (16a) in the direction of the arrow e to be set in the orientation of the damper 12', and the opening 12a faces the side of the hanger 26.

The right limb W(R) and the left limb W(L) are each transferred from the hanger 26 to the damper 12' of the loading station 2st in the unchanged orientation. Subsequently, when the damper 12' moves from the loading station 2st to the slit forming station 3st, the rotation in the e direction in the loading station 2st is canceled, and the damper 12' is set in the orientation of the damper 12. Thus, the slit forming surfaces S (meat surfaces) of both the right limb W(R) and the left limb (L) are arranged to face the slit forming blades 14, respectively. Consequently, the skin surface is kept free from being cut in the slit forming step, making it possible to avoid the decrease in commercial value of boneless meat. The slit forming device 10 (10B) can be used as a dual purpose device capable of simultaneously processing the right limb W(R) and the left limb W(L) of the bone-in limb meats.

Further, in the discharge stations 4st, since the dampers 12 of the slit forming devices 10B1 and 10B2 are rotated in the f directions which are mirror symmetrical, the openings of both the dampers 12 can face in the outward direction suitable for discharge of the works W having undergone slit formation.

The slit forming device 10 (10C) shown in FIG. 8 is configured such that rotation directions of the dampers 12 by the damper rotating parts 16 (16a, 16b) of two slit forming devices 10C1 and 10C2 are the same direction. That is, as shown in the drawing, the slit forming device 10 (10C) is configured such that the rotation directions (e directions) of the dampers 12 in the loading stations 2st of the constituent two slit forming devices are the same, and the rotation directions (f directions) of the dampers 12 in the discharge stations 4st of the two slit forming devices are the same.

In the case of the slit forming device 10 (10C), for example, when the knee joint portion N of the right limb W(R) is placed on the reception part 20 for each of the two slit forming devices 10C1 and 10C2 to face forward, the slit forming surface S (meat surface) of the right limb W(R) faces an opposite side of the bone portion (a reverse side of the drawing of FIG. 1). Thus, when the reception part 20 is rotated by 180°, and the right limb W(R) is loaded to the damper 12' in the loading station 2st, the slit forming surface S (meat surface) of the right limb W(R) suspended by the damper 12' in the loading station 2st faces a front side of the bone portion (the front side in the drawing of FIG. 1; the left side in the drawing of FIG. 8). Therefore, when the damper 12' moves from the loading station 2st to the slit forming station 3st, the rotation in the direction of the arrow e in the loading station 2st is canceled. Thus, the damper 12' is set in the orientation of the damper 12, and the slit forming surface S (meat surface) of the right limb W(R) is arranged to face the slit forming blade 14. Consequently, the skin surface is kept free from being cut in the slit forming station 3st, making it possible to avoid the decrease in commercial value of boneless meat. Thus, the slit forming device 10 (10C) can be used as an exclusive device capable of processing the right limb W(R) of the bone-in limb meat.

Two slit forming devices 10D1 and 10D2 constituting the slit forming device 10 (10D) shown in FIG. 9 are also configured in the same manner. That is, the slit forming device 10 (10D) is configured such that rotation directions of the dampers 12 by the damper rotating parts 16 (16a, 16b) of the two slit forming devices 10D1 and 10D2 are the same direction. As shown in the drawing, the slit forming device 10 (10D) is configured such that the rotation directions (e directions) of the dampers 12 in the loading stations 2st of the constituent two slit forming devices are the same, and the rotation directions (f directions) of the dampers 12 in the discharge stations 4st of the two slit forming devices are the same.

When the left limbs W(L) are placed on the reception parts 20 of the two slit forming devices 10D1 and 10D2 with the knee joint portion N facing forward, the same operation as the slit forming device 10 (10C) is performed. That is, for example, when the knee joint portion N of the left limb W(L) is placed on the reception part 20 for each of the two slit forming devices 10D1 and 10D2 to face forward, the slit forming surface S (meat surface) of the left limb W(L) faces the front side of the bone portion (the front side of the drawing of FIG. 1; that is, the same side as FIG. 1). Thus, when the left limb W(L) is reversed and loaded to the damper 12' of the loading station 2st, the slit forming surface S (meat surface) of the left limb W(L) suspended by the damper 12' of the loading station 2st faces the opposite side of the bone portion (the opposite side in the drawing of FIG. 1; the right side in the drawing of FIG. 9). Therefore, when the damper 12 moves from the loading station 2st to the slit forming station 3st, the rotation in the direction of the arrow e in the loading station 2st is canceled. Thus, the damper 12 is set in the orientation of the damper 12, and the slit forming surface S (meat surface) of the left limb (L) is arranged to face the slit forming blade 14. Therefore, the skin surface is kept free from being cut in the slit forming station 3st. Thus, the slit forming device 10 (10D) can be used as an exclusive device capable of processing the left limb W(L) of the bone-in limb meat.

Further, in the slit forming device 10 (10C, 10D), in the discharge stations 4st as well, the dampers 12 of the two slit forming devices are rotated in the same direction to each be set in the orientation of damper 12'. Thus, the openings of both the dampers 12' can face the outward direction suitable for discharge of the works W having undergone slit formation.

In an embodiment, as shown in FIGS. 3 and 7 to 9, the slit forming blade 14 is disposed on the outer circumference side of the slit forming station 3st. Thus, maintenance of the slit forming blade 14 becomes easy. Alternatively, the slit forming blade 14 may be disposed on the radially outer side of the circumference C with respect to the slit forming station 3st. In this case, maintenance of the slit forming blade 14 becomes easier. Note that the slit forming blade 14 may be disposed on the radially inner side of the circumference C with respect to the slit forming station 3st.

In another embodiment, the slit forming blade 14 may be disposed on the inner circumference side of the slit forming station 3st.

The contents described in the above embodiments would be understood as follows, for instance.

1) A slit forming device (10 (10A, 10B, 10C, 10D)) according to one aspect includes a damper (12) configured to pass through a plurality of stations (1st to 4st) arranged on a circumference (C), a slit forming blade (14) disposed on an outer circumference side or an inner circumference side of a slit forming station (3st) among the plurality of stations, and a damper rotating part (16 (16a, 16b)) capable of rotating the damper about a vertical line such that a slit forming surface (S) of a work (W) faces the slit forming blade in the slit forming station.

With the above configuration, in order to achieve downsized layout, in a case where the slit forming blade is placed in a position radially deviated from the circumferential trajectory of the damper, it is possible to reliably form a slit in the slit forming surface of the work, by rotating the damper such that the slit forming surface faces the slit forming blade. Thus, it is possible to downsize a device for automating a slit forming step and to improve processing efficiency.

2) The slit forming device (10) according to another aspect is the slit forming device defined in 1), where the plurality of stations (1st to 4st) include a loading station (2st) for the work (W) located upstream of the slit forming station (3st), and the damper rotating part (16 (16a)) is configured to rotate the damper such that a difference between a first angle ($\theta 1$) and a second angle ($\theta 2$) is not less than 80 degrees and not greater than 100 degrees, the first angle being formed by the slit forming surface (S) with respect to a tangent (t) direction to the circumference (C) in the loading station, the second angle being formed by the slit forming surface with respect to the tangent direction in the slit forming station (3st).

With the above configuration, in the loading station and the slit forming station, it is possible to orient the slit forming surface of the work at the angle suitable for the processing operation in each of these stations, making it possible to improve working efficiency.

3) The slit forming device (10) according to still another aspect is the slit forming device defined in 2), where the first angle ($\theta 1$) is in a direction orthogonal to the tangent (t) direction to the circumference (C), and the second angle ($\theta 2$) is in a direction along the tangent direction to the circumference.

With the above configuration, since the first angle is in the direction orthogonal to the tangent direction to the circumference, the work is loaded easily. Further, since the second angle is in the direction along the tangent direction to the circumference, it is possible to arrange the slit forming surface of the work to face the slit forming blade placed in the position radially deviated from the circumferential trajectory of the damper.

4) The slit forming device (10) according to yet another aspect is the slit forming device defined in any one of 1) to 3), where the plurality of stations (1st to 4st) include a discharge station (4st) for the work (W) located downstream of the slit forming station (3st), and the damper rotating part (16 (16b)) is configured to rotate the damper (12) such that a difference between a first angle ($\theta 1$) and a third angle ($\theta 3$) is not less than 80 degrees and not greater than 100 degrees, the first angle being formed by the slit forming surface (S) with respect to a tangent (t) direction to the circumference (C) in the slit forming station, the third angle ($\theta 3$) being formed by the slit forming surface with respect to the tangent (t) direction in the discharge station (4st).

With the above configuration, in the discharge station, when the work having undergone slit formation is discharged, it is possible to arrange the work at the angle suitable for the discharge operation.

5) The slit forming device (10) according to yet another aspect is the slit forming device defined in 4), where the third angle ($\theta 3$) is in a direction orthogonal to the tangent (t) direction to the circumference (C).

With the above configuration, since the third angle is in the direction orthogonal to the tangent direction to the circumference, the work having undergone slit formation is easily discharged.

6) The slit forming device (10) according to yet another aspect is the slit forming device defined in any one of 1) to 5), where the damper rotating part (16 (16a, 16b)) is configured to be able to switch a rotation direction of the damper (22).

With the above configuration, when the work is bone-in limb meat including the right limb W(R) and the left limb W(L), slit formation for both of the right limb and the left limb is possible.

7) The slit forming device (10) according to yet another aspect is the slit forming device defined in any one of 1) to 6), where two slit forming devices (10B1, 10B2, 10C1, 10C2, 10D1, 10D2) are arranged such that movement trajectories (C) of the dampers (22) are mirror symmetrical.

With the above configuration, since the movement trajectories of the dampers in the two slit forming devices are mirror symmetrical, downsized arrangement is possible, and using the two slit forming devices, it is possible to increase processing efficiency.

8) The slit forming device (10) according to yet another aspect is the slit forming device defined in 7), where the slit forming device is configured such that, in two slit forming devices (10B1, 10B2), rotation directions of the dampers (22) by the damper rotating parts (16 (16a, 16b)) are mirror symmetrical.

With the above configuration, when the work is bone-in limb meat including the right limb and the left limb, in a case where the slit forming device is used as a dual purpose device for forming a slit in the right limb by one slit forming device and for forming a slit in the left limb by the other slit forming device, it is possible to arrange a desired slit forming surface to face the slit forming blade in each of both the slit forming devices.

9) The slit forming device (10) according to yet another aspect is the slit forming device defined in 7), where the slit forming device is configured such that, in the two slit forming devices (10C1, 10C2, 10D1, 10D2), rotation directions of the dampers (22) by the damper rotating parts (16 (16a, 16b)) are the same direction.

With the above configuration, in a case where the work is bone-in limb meat, and the slit forming device is used as an exclusive device for forming a slit in one of the right limb or the left limb by the two slit forming devices, it is possible to arrange a desired slit forming surface to face the slit forming blade in each of both the slit forming devices.

10) The slit forming device (10) according to yet another aspect is the slit forming device defined in any one of 1) to 9), where the slit forming blade (14) is disposed on the outer circumference side of the slit forming station (3st) among the plurality of stations (1st to 4st).

With the above configuration, since the slit forming blade is disposed on the outer circumference side of the slit forming station, maintenance of the slit forming blade becomes easy.

REFERENCE SIGNS LIST

10 (10A, 10B, 10C, 10D), 10B1, 10B2, 10C1, 10C2, 10D1, 10D2 Slit forming device
1st Transfer station
2st Loading station
3st Slit forming station 4st Discharge station
12, 12' Clamper
12a Opening
14 Slit forming blade
16 (16a, 16b) Clamper rotating part
20 Reception part
22a Slot
22 Transfer part
24 Rotational shaft
26 Hanger
26a Recess
28 Motor
30 Guard ring
32 Feed ring
33 Support shaft
34 Guide bar
36 Bracket
40 Air cylinder
42 Piston
42a Shaft
44, 44' Cam member
46 Rotatable shaft
48, 48', 48" Swing roller
49 Arm
50 Clasp
52 Coil spring
54 Support plate
54a Shaft
56, 58 Lifting/lowering roller
60 Chuck
62 Bar
C Circumference (movement trajectory)
O Center line
N Knee joint portion
P Vertical line
S Slit forming surface
W Work
W(R) Right limb
W(L) Left limb
t Tangent
θ1 First angle
θ2 Second angle
θ3 Third angle

The invention claimed is:

1. A slit forming device comprising:
a clamper configured to pass through a plurality of stations arranged on a circumference;
a slit forming blade disposed on an outer circumference side or an inner circumference side of a slit forming station among the plurality of stations; and
a clamper rotating part capable of rotating the clamper about a vertical line such that a slit forming surface of a work faces the slit forming blade in the slit forming station,
wherein the plurality of stations include a loading station for the work located upstream of the slit forming station, and
wherein the clamper rotating part is configured to rotate the clamper such that a difference between a first angle and a second angle is not less than 80 degrees and not greater than 100 degrees, the first angle being formed by the slit forming surface with respect to a tangent direction to the circumference in the loading station, the second angle being formed by the slit forming surface with respect to the tangent direction in the slit forming station.

2. The slit forming device according to claim 1,
wherein the first angle is in a direction orthogonal to the tangent direction to the circumference, and
wherein the second angle is in a direction along the tangent direction to the circumference.

3. The slit forming device according to claim 1,
wherein the slit forming blade is disposed on the outer circumference side of the slit forming station among the plurality of stations.

4. A slit forming device comprising:
a clamper configured to pass through a plurality of stations arranged on a circumference;
a slit forming blade disposed on an outer circumference side or an inner circumference side of a slit forming station among the plurality of stations; and
a clamper rotating part capable of rotating the clamper about a vertical line such that a slit forming surface of a work faces the slit forming blade in the slit forming station,
wherein the plurality of stations include a discharge station for the work located downstream of the slit forming station, and
wherein the clamper rotating part is configured to rotate the clamper such that a difference between a first angle and a third angle is not less than 80 degrees and not greater than 100 degrees, the first angle being formed by the slit forming surface with respect to a tangent direction to the circumference in the slit forming station, the third angle being formed by the slit forming surface with respect to the tangent direction in the discharge station.

5. The slit forming device according to claim 4,
wherein the third angle is in a direction orthogonal to the tangent direction to the circumference.

6. A slit forming device comprising:
a clamper configured to pass through a plurality of stations arranged on a circumference;
a slit forming blade disposed on an outer circumference side or an inner circumference side of a slit forming station among the plurality of stations; and
a clamper rotating part capable of rotating the clamper about a vertical line such that a slit forming surface of a work faces the slit forming blade in the slit forming station,
wherein the clamper rotating part is configured to be able to switch a rotation direction of the clamper.

7. A slit forming device comprising:
a clamper configured to pass through a plurality of stations arranged on a circumference;
a slit forming blade disposed on an outer circumference side or an inner circumference side of a slit forming station among the plurality of stations; and
a clamper rotating part capable of rotating the clamper about a vertical line such that a slit forming surface of a work faces the slit forming blade in the slit forming station,
wherein two slit forming devices are arranged such that movement trajectories of the clampers are mirror symmetrical.

8. The slit forming device according to claim 7,
wherein the slit forming device is configured such that, in two slit forming devices, rotation directions of the clampers by the clamper rotating parts are mirror symmetrical.

9. The slit forming device according to claim 7, wherein the slit forming device is configured such that, in the two slit forming devices, rotation directions of the clampers by the clamper rotating parts are the same direction.

* * * * *